Patented Feb. 5, 1935

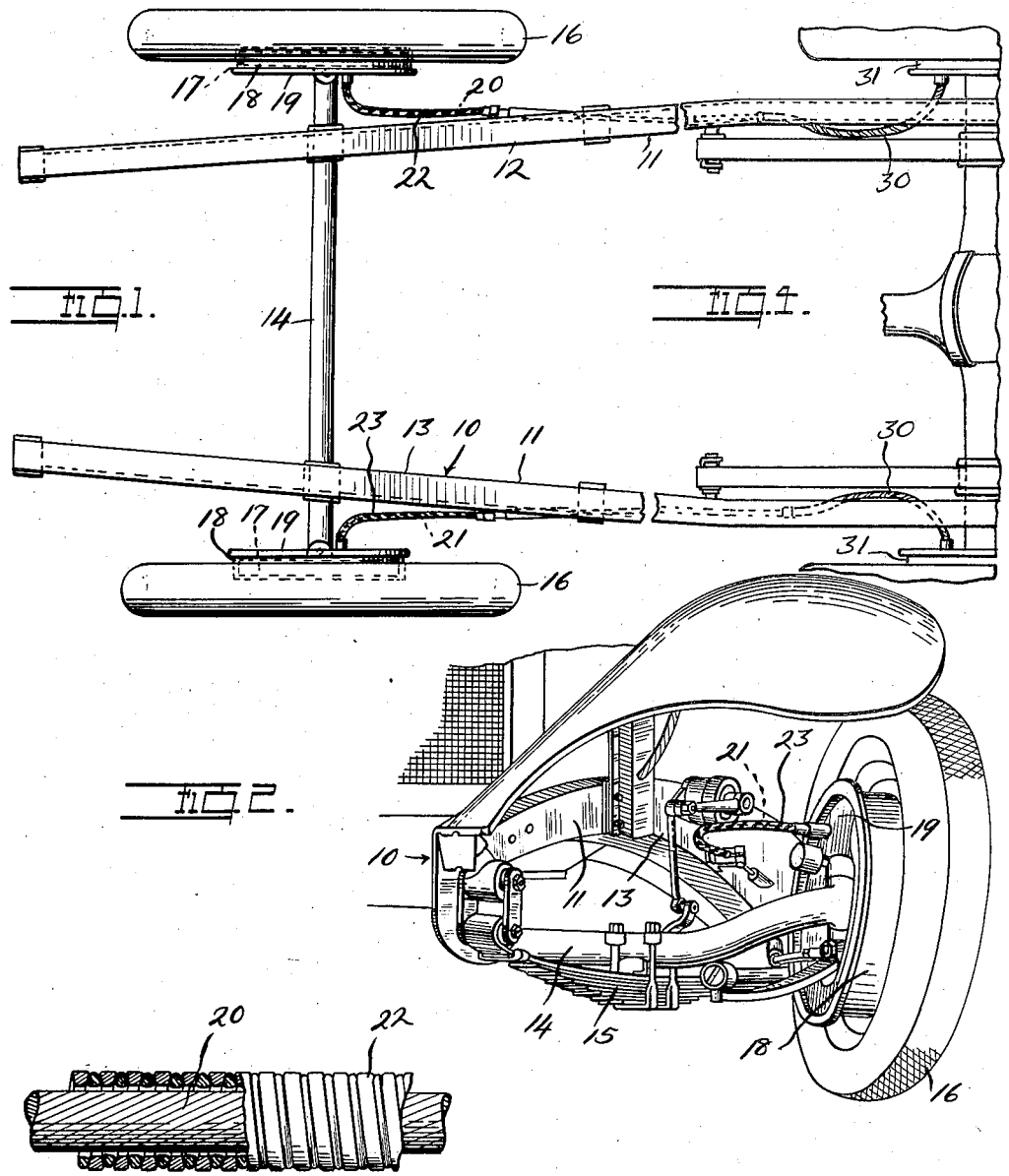

1,990,100

UNITED STATES PATENT OFFICE 1,990,100

BRAKE OPERATOR

Hadley Smith, Royal Oak, Mich., assignor to Hupp Motor Car Corporation, Detroit, Mich., a corporation of Virginia Application June 12, 1933, Serial No. 675,480

8 Claims. (Cl. 188—204)

This invention relates generally to motor vehicles and refers more particularly to improvements in chassis constructions for motor vehicles.

In motor vehicles as now commercially produced, it is customary to support the brake operating cables adjacent the ends of the latter connected to the brake actuating means by conduits having the inner ends anchored to the frame or other suitable sprung part of the vehicle and having the opposite ends secured to an unsprung part of the vehicle such as the backing plates of the brakes. As is usually the case, the conduits are formed by coiling a strip of metal into a spiral and winding a spring around the spiral with the coils of the latter interposed between the convolutions of the conduit so as to impart sufficient flexibility to the latter to permit the necessary relative movement of the opposite ends of the conduits and at the same time impart the rigidity to the conduits required to render the latter efficient supports for the cables.

The conduits briefly outlined above have been found satisfactory for the purpose previously discussed, but exhaustive research has proven that prior installations of these conduits introduces errors not only in the braking system of the vehicle, but also in the steering system, and, accordingly, materially distracts from the efficiency of operation of both of these systems. In the past, the conduits associated with the brakes on one side of the vehicle were coiled in the same direction as the conduits for the brakes on the opposite side of the vehicle, and inasmuch as the ends of the conduits are fixed against rotation, it necessarily follows that relative movement of the ends of the conduits on opposite sides of the vehicle causes the conduit on one side to unwind and the conduit on the opposite side to wind up. Winding one of the conduits decreases the diameter of the latter, and, as a consequence, increases the length thereof between the fixed ends exerting a pull on the cable extending therethrough in a direction to apply the associated brake. On the other hand, unwinding of the conduit on the opposite side of the vehicle increases the diameter of this conduit or, in other words, decreases the over-all length thereof causing the cable extending therethrough to move in a direction tending to release the associated brake. While the actual movement of the cables effected by the foregoing action of the conduits is relatively slight, nevertheless, it renders it practically impossible to obtain equalized brake action, and, furthermore, has a detrimental effect on the steering control of the vehicle, especially when the brakes associated with the dirigible wheels are applied, since the resulting relative movement between the parts to which opposite ends of the cables are connected effects a further application of the brake associated with one of the wheels for reasons stated above or, in other words, causes unequalized braking operation which in turn reacts upon the steering mechanism to effect a diving of the vehicle.

The present invention contemplates securing all of the advantages it is possible to derive through the use of conduits of the type previously set forth and at the same time eliminate the errors heretofore introduced by such conduits in the brake system as well as the detrimental effect thereof on the steering mechanism. As will be more fully hereinafter set forth, the foregoing is accomplished herein by forming the conduit associated with the brake on one side of the vehicle so that the convolutions thereof extend in a direction opposite to the convolutions of the conduit connected with the corresponding brake on the other side of the vehicle so that relative movement of the ends of these conduits will have the same effect on the brakes, and, as a consequence, will not disturb the equalized condition of the latter.

It is a further object of the present invention to utilize the reaction of the conduits on the brake actuating cables to apply the front brakes to a greater extent than the rear brakes. This is accomplished herein by winding the conduits associated with the front brakes in directions predetermined so that the reaction of these conduits on the brake operating cables is such as to assist the pedal pressure in applying the brakes and by winding the conduits associated with the rear brakes in opposite directions so as to have the effect of releasing the rear brakes.

The foregoing as well as other objects will be made more apparent as this description proceeds, especially when considered in connection with the accompanying drawing, wherein:

Figure 1 is an enlarged semi-diagrammatic plan view of a vehicle chassis equipped with the present invention;

Figure 2 is a fragmentary perspective view illustrating the manner in which the brake conduit is secured to the brake and frame;

Figure 3 is a fragmentary sectional view through a brake conduit constructed in accordance with this invention;

Figure 4 is a view similar to Figure 1 showing the rear brake assembly.

Referring now to the drawing, it will be noted that there is illustrated in Figure 1 a chassis 10 comprising a frame 11 having laterally spaced sill members 12 and 13 extending longitudinally of the chassis. Extending transversely of the frame 11 below the same is a front axle 14 operatively connected to the chassis by means of suitable springs 15 having the central portions fixed to the axle adjacent opposite ends thereof and having the ends connected to the sill members of the frame. Mounted upon opposite ends of the axle in any conventional manner are the dirigible wheels 16 having brakes 17 associated therewith. The brakes 17 are preferably of the internal expanding type having drums 18 fixed to the dirigible wheels and having backing plates 19 anchored in any suitable manner to opposite ends of the axle.

In accordance with conventional practice, a suitable control (not shown) on the vehicle is operatively connected to the braking mechanism (not shown) within the drums 18 by means of a pair of cables 20 and 21. As is usually the case, the end portions of the cables adjacent the brakes are extended through conduits 22 and 23 arranged upon opposite sides of the chassis frame. The outer ends of the aforesaid conduits are fixed to the backing plates 19 of the brakes 17, while the opposite ends of the conduits 22 and 23 are respectively secured in any suitable manner to the sills 12 and 13. Inasmuch as opposite ends of the conduits are respectively secured to sprung and unsprung parts of the chassis as previously pointed out, it is necessary that these conduits be sufficiently flexible to provide for relative movement of these parts occasioned by spring deflection. In the present instance, each of the conduits is formed by coiling a strip of metal to form a spiral of sufficient internal diameter to receive the cables and having coiled springs wound around the same with the coils of the springs interposed between the convolutions of the spirals. The purpose of the springs is to impart a certain degree of rigidity to the conduits while at the same time affording sufficient flexibility of the conduits to provide for the relative movement of the sprung and unsprung parts of the vehicle to which the ends of the conduits are secured.

In vehicles as now commercially produced, the convolutions of the conduit 22 extend in the same direction as the convolutions of the conduit 23 on the opposite side of the chassis, with the result that relative deflection of the sprung and unsprung parts of the vehicle to which the ends of the conduits are fastened causes the conduit on one side of the chassis to wind up and the conduit on the other side of the chassis to unwind an amount depending upon the degree of deflection. Which of the two conduits unwind as the other conduit winds up depends upon the direction the convolutions of the conduits extend. In any event, the foregoing action of the conduits is highly detrimental to brake equalization, and in order to illustrate the effect of the conduits on the braking system, let it be assumed that the brakes are suddenly applied when the vehicle is moving forwardly. Application of the brakes during forward motion of the vehicle shifts a considerable portion of the sprung weight upon the front springs 15 or, in other words, causes the frame and associated ends of the conduits to move downwardly toward the axle 14. Assuming that both conduits are wound in a clockwise direction as viewed from the outer ends thereof, it will be apparent that downward movement of the end of the conduit connected to the frame on the left-hand side of the chassis relative to the opposite end of this conduit causes the latter to wind up, and, as a consequence, decrease in diameter. Decreasing the diameter of the aforesaid conduit obviously increases the length thereof a distance depending upon the extent of movement of the end of the same, and inasmuch as the opposite ends of this latter conduit are fixed, it necessarily follows that an increase in length thereof effects an increase in the degree of curvature of the same between the fixed ends which in turn reacts upon the cable extended therethrough tending to move the latter in a direction to tighten the brake. On the other hand, downward movement of the end of the cable on the right-hand side of the chassis causes the conduit to unwind or to increase in diameter. Increasing the diameter of the latter conduit causes a decrease in the length thereof, and inasmuch as the opposite ends of this conduit are also fixed, it will be apparent that a decrease in length of the same correspondingly decreases the degree of curvature thereof tending to move the cable extending therethrough in a direction to release the right-hand brake. As a consequence, the left-hand brake will be applied to a greater extent than the right-hand brake destroying equalized braking efficiency and causing a diving of the vehicle to the left. The above action is greatly aggravated by the tendency for the axle to roll forwardly upon application of the brakes inasmuch as rocking of the axle in the above direction effects a corresponding movement of the associated ends of the conduits tending to further unwind the left-hand conduit and to wind the right-hand conduit.

The foregoing error introduced into the braking mechanism by the conduits is eliminated herein by forming the conduit on one side of the chassis with the convolutions extending in a direction opposite to the direction of the convolutions of the conduit on the opposite side of the chassis. For the purpose of illustration, the convolutions of the conduit 22 are shown as extending in a clockwise direction as viewed from the front of the vehicle, while the convolutions of the conduit 23 extend in a counterclockwise direction so that it necessarily follows that both of these conduits will wind up upon downward movement of the frame, and, accordingly, will react upon the brake actuating members or cables to move the same in directions to assist the pedal pressure in applying the brakes. Furthermore, the reaction of the axle to the braking or, in other words, rocking of the axle in a forward direction also tends to wind up both cables and thereby further assist in the application of the brakes. It should be understood at this time that if desired, the conduit 22 may be wound in a counterclockwise direction and the conduit 23 may be wound in a clockwise direction so that the aforesaid movements of the frame and axle effect an unwinding of the cables tending to release the brakes through the medium of the cables. However, the former arrangement is preferred since it does not counteract the pedal pressure in applying the brake, but, on the other hand, assists this pressure.

If desired, the brake conduits 30 for the rear wheel brakes 31 of the chassis may also be wound in opposite directions, and in cases where the front brake conduits are wound in directions to assist the pedal pressure in applying the brakes, the rear wheel brake conduits 30 are wound in directions to counteract the pedal pressure tending to release the rear brakes. In detail, the rear brake conduit 30 on the same side of the vehicle chassis as the conduit 23 is wound in a direction opposite to the direction of wind of the latter conduit, while the conduit 30 on the opposite side of the chassis is wound in a direction opposite to the direction of the front brake conduit 22 on the same side of the chassis. In the illustrative embodiment of the invention, the front conduits are wound in directions to assist the pedal pressure in applying the front brakes so that by winding the conduits associated with the rear brakes in the opposite direction, it necessarily follows that these latter conduits will tend to release the brakes and thereby provide for applying the front brakes to a greater extent than the rear brakes.

What I claim as my invention is:

1. A vehicle chassis having in combination, an unsprung assembly including an axle and brakes upon opposite ends of said axle, a sprung assembly supported by the axle, members operatively connected to each brake for actuating the same, and supporting means for receiving the ends of the members connected to the brakes including conduits having the inner ends respectively fixed to opposite sides of the sprung assembly and having the other ends respectively anchored to the brakes, said conduits formed of coiled strips and the convolutions of the conduit on one side of the sprung assembly extend in a direction opposite to the convolutions of the conduit at the opposite side so that both conduits will have the same reaction on the brakes upon relative movements of the ends thereof.

2. A vehicle chassis construction having in combination, a frame, an axle extending transversely of the frame, means connecting the axle to the frame permitting relative movement of the frame and axle, brakes associated with opposite ends of the axle and having backing plates anchored to the latter, a cable operatively connected to each of said brakes for actuating the same, supporting means for receiving the ends of the cables connected to the brakes including conduits having the inner ends respectively fixed to opposite sides of the frame and having the outer ends respectively fixed to the backing plates aforesaid of the brakes, said conduits formed of coiled strips and the convolutions of the conduit on one side of the sprung assembly extend in a direction opposite to the convolutions of the conduit at the opposite side so that both conduits will have the same reaction on the brakes upon relative movements of the ends thereof.

3. A vehicle chassis construction having in combination, an unsprung assembly including brakes on opposite sides of the chassis adjacent the front and rear ends of the latter, a sprung assembly on said chassis, a flexible conduit associated with each brake having the outer ends fixed to the brakes and having the inner ends fixed to the adjacent sides of the sprung assembly, a member slidably engaging within each conduit and connected to the associated brake for actuating the same, said conduits formed of coiled strips and the conduits for the brakes on one side of the sprung assembly being wound in directions opposite to each other and also opposite to the direction of wind of the conduits on the opposite side of the sprung assembly.

4. A vehicle chassis construction having in combination, an unsprung assembly including brakes on opposite sides of the chassis adjacent the front and rear ends of the latter, a sprung assembly on said chassis, a flexible conduit associated with each brake having the outer ends fixed to the brakes and having the inner ends fixed to the adjacent sides of the sprung assembly, a member slidably engaging within each conduit and connected to the associated brake for actuating the same, said conduits formed of coiled strips and the conduits associated with the front brakes being wound in opposite directions determined so that said conduits will react upon the members therein tending to apply the brakes upon relative movement of the ends thereof and the conduits associated with the rear brakes being wound in directions opposite to the direction of wind of the front conduits so as to react upon the members therein tending to release the rear brakes upon relative movement of the ends of the conduits associated with the latter.

5. A vehicle chassis having in combination, an unsprung assembly including road engaging wheels on opposite sides thereof and a brake associated with each wheel, a sprung assembly supported by the road engaging wheels, a flexible conduit on each side of the chassis having the outer ends supported upon the unsprung assembly and having the inner ends connected to the sprung assembly, a member extending through each of the conduits to the brakes for actuating the same, said conduits being formed of coiled strips of material and the convolutions of the conduit on one side of the sprung assembly extending in a direction opposite to the convolutions of the conduit on the other side of said assembly whereby both conduits have the same reaction on the members passing therethrough upon relative movements of the ends of said conduits.

6. A vehicle chassis construction having in combination, an unsprung assembly and a sprung assembly, said unsprung assembly including brakes on opposite sides of the chassis adjacent the front end thereof and brakes on opposite sides of the chassis adjacent the rear end thereof, a flexible conduit associated with each brake having the outer ends fixed to the unsprung assembly and having the inner ends fixed to the sprung assembly, a member extending through each of the conduits and connected to the brakes for actuating the same, said conduits being formed of coiled strips and the conduits associated with the front brakes being normal in directions opposite to each other so as to react in the same manner upon the members passing therethrough and the conduits associated with the rear brakes also being wound in directions opposite to each other so that both of these conduits will react in the same manner upon the members passing therethrough.

7. A vehicle chassis construction having in combination, an unsprung assembly and a sprung assembly, said unsprung assembly including brakes on opposite sides of the chassis, a flexible conduit on each side of the chassis having the outer ends fixed to the unsprung assembly and having the inner ends fixed to the sprung assembly, a member extending through each of the conduits and connected to the brakes for actuating the same, said conduits formed of coiled strips and being wound in opposite directions predetermined so that both conduits will react upon the members extending therethrough in such a manner as to tend to apply the brakes upon relative displacement of the ends of said conduits.

8. A vehicle chassis having in combination, an unsprung assembly including road engaging wheels on opposite sides thereof and a brake associated with each wheel, a sprung assembly supported by the road engaging wheels, a brake actuating member on each side of the chassis having the outer ends operatively connected to the brakes and having portions spaced from the outer ends mounted on the sprung assembly, and means receiving the brake actuating members to support the same comprising flexible conduits having the opposite ends respectively secured to the sprung and unsprung assemblies and adapted to vary in length to the same extent for the same degree of relative displacement of the ends thereof, said conduits being so constructed that the reaction of the brake operating members to relative movement of the opposite ends of the conduits will have the same effect on both brakes.

HADLEY SMITH.